United States Patent
Lukas et al.

(10) Patent No.: US 9,757,720 B2
(45) Date of Patent: Sep. 12, 2017

(54) CATALYST HAVING A THREE-DIMENSIONAL DENT STRUCTURE IN THE FORM OF A HEXAGON

(71) Applicant: Heraeus Deutschland GmbH & Co. KG, Hanau (DE)

(72) Inventors: Annette Lukas, Rodenbach (DE); Guenter Glaab, Hoesbach (DE); Stephan Humm, Gelnhausen (DE); Hubertus Goelitzer, Alzenau (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 0 days.

(21) Appl. No.: 14/769,324

(22) PCT Filed: Feb. 20, 2014

(86) PCT No.: PCT/EP2014/053327
§ 371 (c)(1),
(2) Date: Aug. 20, 2015

(87) PCT Pub. No.: WO2014/128216
PCT Pub. Date: Aug. 28, 2014

(65) Prior Publication Data
US 2015/0375220 A1  Dec. 31, 2015

(30) Foreign Application Priority Data
Feb. 21, 2013 (DE) .................. 10 2013 101 749

(51) Int. Cl.
*B01J 23/38* (2006.01)
*B01J 35/06* (2006.01)
(Continued)

(52) U.S. Cl.
CPC ............... *B01J 35/06* (2013.01); *B01J 19/32* (2013.01); *B01J 23/42* (2013.01); *B01J 23/464* (2013.01); *C01B 21/265* (2013.01); *C01C 3/0216* (2013.01)

(58) Field of Classification Search
CPC .................................. B01J 23/38; B01J 35/06
(Continued)

(56) References Cited

U.S. PATENT DOCUMENTS 2,045,632 A   6/1936  Colby
2,274,684 A * 3/1942  Goodloe ............... B01D 39/12
                                                        245/10

(Continued)

FOREIGN PATENT DOCUMENTS

CA    2248291 A1   10/1997
CN    1224374 A    7/1999
(Continued)

OTHER PUBLICATIONS

Office Action issued Jan. 15, 2014 in DE Application No. 102013101749.5.
(Continued)

*Primary Examiner* — Cam N. Nguyen
(74) *Attorney, Agent, or Firm* — Panitch Schwarze Belisario & Nadel LLP

(57) ABSTRACT

A catalyst includes a gas-permeable textile sheet material made of noble-metal-containing wire having a three-dimensional secondary structure produced thereon. The secondary structure is a three-dimensional dent structure including dents arranged adjacent to each other in rows in two spatial directions. The dents are in the form of a hexagon. The dent structure is formed by self-organization in a denting process.

7 Claims, 2 Drawing Sheets

(51) Int. Cl.
*B01J 19/32* (2006.01)
*B01J 23/42* (2006.01)
*B01J 23/46* (2006.01)
*C01B 21/26* (2006.01)
*C01C 3/02* (2006.01)

(58) Field of Classification Search
USPC .................................................. 502/326, 339
See application file for complete search history.

(56) References Cited

U.S. PATENT DOCUMENTS

| | | | | |
|---|---|---|---|---|
| 3,270,798 | A * | 9/1966 | Ruff | F23D 14/18 422/211 |
| 3,956,192 | A | 5/1976 | Nicolai | |
| 3,993,600 | A * | 11/1976 | Hunter | B01J 12/007 422/211 |
| 4,375,426 | A * | 3/1983 | Knapton | B01J 12/007 502/325 |
| 4,869,891 | A * | 9/1989 | Handley | B01J 35/06 423/403 |
| 5,267,157 | A * | 11/1993 | Churchill | B60W 30/1819 477/57 |
| 5,401,483 | A | 3/1995 | Ostroff | |
| 5,887,470 | A | 3/1999 | Mirtsch | |
| 6,030,594 | A | 2/2000 | Ward | |
| 6,089,051 | A * | 7/2000 | Gorywoda | B01J 35/06 442/316 |
| 6,849,206 | B2 * | 2/2005 | Matsuo | B01D 39/12 210/336 |
| 8,846,190 | B2 * | 9/2014 | Belcher | B82Y 30/00 428/292.1 |
| 9,056,307 | B2 * | 6/2015 | Keller | B01J 23/42 |
| 9,126,187 | B2 * | 9/2015 | Keller | B01J 23/42 |
| 2002/0127932 | A1 * | 9/2002 | Neumann | B01J 23/40 442/6 |

FOREIGN PATENT DOCUMENTS

| | | |
|---|---|---|
| DE | 2353640 A1 | 4/1975 |
| DE | 19651937 A1 | 6/1998 |
| DE | 102005041555 A1 | 8/2007 |
| DE | 102010034076 B3 | 12/2011 |
| EP | 0693008 B1 | 12/1997 |
| EP | 2418028 A1 | 2/2012 |
| RU | 101653 U1 | 5/2011 |
| WO | 9324229 A1 | 12/1993 |
| WO | 9422612 A1 | 10/1994 |

OTHER PUBLICATIONS

International Search Report issued May 16, 2014 in International Application No. PCT/EP2014/053327.
International Preliminary Report on Patentability issued Sep. 3, 2015 in International Application No. PCT/EP2014/053327.
Office Action issued Jul. 22, 2016 in CN Application No. 2014800096549.
Office Action issued Nov. 14, 2016 in RU Application No. 2015139857/04.

* cited by examiner

CATALYST HAVING A THREE-DIMENSIONAL DENT STRUCTURE IN THE FORM OF A HEXAGON

CROSS-REFERENCE TO RELATED APPLICATIONS

This application is a Section 371 of International Application No. PCT/EP2014/053327, filed Feb. 20, 2014, which was published in the German language on Aug. 28, 2014, under International Publication No. WO 2014/128216 A1 and the disclosure of which is incorporated herein by reference.

BACKGROUND OF THE INVENTION

Heterogeneous catalysts are used, for example, in the preparation of hydrocyanic acid by the Andrussow process or in the preparation of nitric acid by the Ostwald process. In these reactions, the reactants and the catalyst are present in different phases and the reactions proceed at the surface of the catalyst.

In the case of noble metal catalysts composed of a permeable catalyst gauze, a fluid containing the unreacted starting materials flows through the catalyst gauze during the reaction. In general, the shaped catalyst body has one or more catalyst gauzes which are arranged one after the other and are arranged transverse to the flow direction of the fluid containing the starting materials to be reacted.

An important parameter of such catalyst gauzes is their catalytic effectiveness. Lastingly high conversions of the starting materials and good yields are achieved when the catalyst gauze has a large catalytically active surface, a low flow resistance and, at the same time, a high strength. Catalyst gauzes having a good catalytically active surface are frequently produced from noble metal wire using textile processing techniques, for example, by machine weaving, drawn-loop knitting or formed-loop knitting.

However, in these manufacturing methods, the flexural and tensile strengths and the ductility of the noble metal wires play a limiting role. Thus, for example, only noble metal wires having particularly wide diameters and tensile strengths are suitable for drawn-loop knitting of wires composed of, in particular, platinum-rhodium, platinum-palladium-rhodium, palladium-nickel, palladium-copper and palladium-nickel-copper alloys. As a result, the catalytically active surface area is fixed in a particular range.

Moreover, the catalyst gauzes produced by textile processing techniques have a high flexibility and a low stiffness because of their gas-permeable structure with measures and loops.

If a fluid flows through these catalyst gauzes, the gauzes are subjected to high pressures and thus high mechanical stresses. Thus, an ammonia-oxygen mixture is usually passed at high velocity through the catalyst gauze in the preparation of nitric acid by the Ostwald process, in order to achieve a high yield. In the Ostwald process, the reaction temperature is usually from about 800° C. to 1100° C. and the pressure is from 1 to 12 bar.

Catalyst gauzes having a high dimensional stability can, in principle, withstand high pressures better and contribute to uniform flow through the catalyst; a high stiffness and dimensional stability of the catalyst gauzes are therefore desirable, in principle, for reasons of reproducibility.

It is known that a higher strength of catalyst gauzes can be achieved when the gauzes have a secondary structure. U.S. Pat. No. 5,401,483 A and U.S. Pat. No. 6,030,594 A describe, for example, a secondary structure in the form of folding. A catalyst support having a plurality of knitted wire gauzes composed of metal with folding arranged one after the other is known from DE 23 53 640 A1. In the case of the catalyst support, the individual gauzes are also folded to effect mechanical stabilization.

However, folds provide secondary structures having a pronounced preferential direction, which can lead to formation of catalytically inefficient flow paths and locally different flow resistances, and thus to non-uniform flow behavior and a low efficiency and yield.

These disadvantages are avoided by catalyst gauzes having a secondary structure made up of three-dimensional embossed patterns as are known, for example, from U.S. Pat. No. 2,045,632 A and, in particular, from WO 93/24229 A1. The catalyst gauze of WO 93/24229 A1 is used for the catalytic conversion of ammonia into nitrogen oxide. The three-dimensional embossed pattern contains raised regions and depressions and is, for example, referred to as "embossed, contoured or provided with pits". The secondary structure with which the gauze is provided serves to prevent deformation into a tortoise-shell-like structure, as is observed when planar gauzes are used, which reduces the flexibility of the gauzes. It is produced either directly during gauze manufacture or subsequently by pressing.

However, such catalyst gauzes are mechanically weakened in the region of the embossed places by deformation during the embossed process.

BRIEF SUMMARY OF THE INVENTION

It is therefore an objective of the present invention to provide a simple-to-manufacture catalyst which has a high mechanical stability and is also optimized with respect to its flow behavior and thus, is optimized in terms of catalytic efficiency and yield.

According to embodiments of the present invention, proceeding from a catalyst of the type mentioned at the outset, the secondary structure is a dent structure which has adjacent dents which are arranged next to one another in two dimensions, with the dent structure being formed by self-organization in a denting operation.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
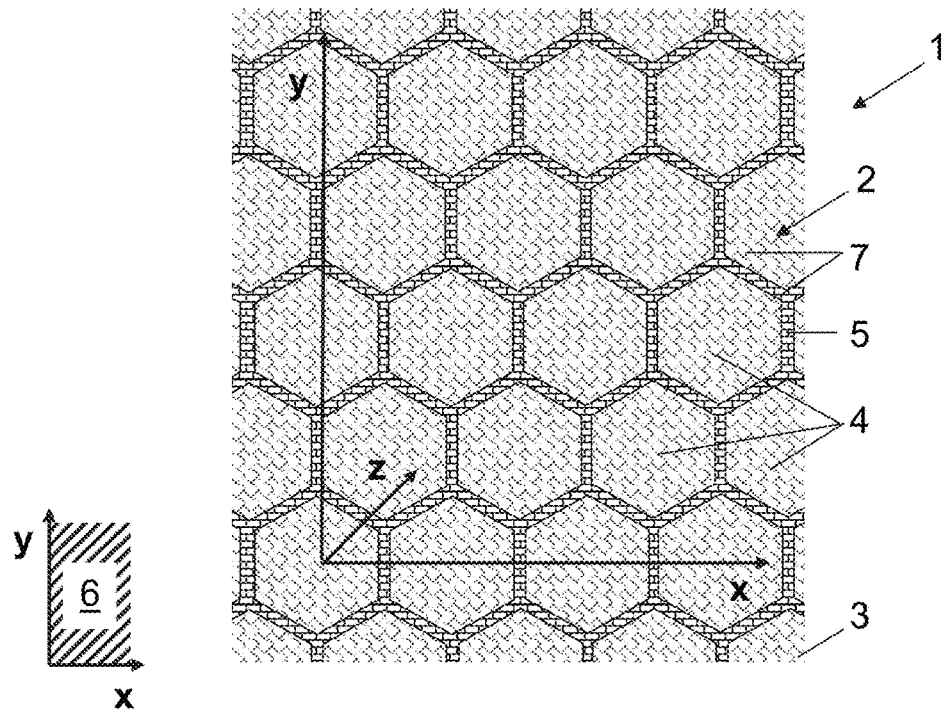
FIG. 1 schematically shows, in plan view, an embodiment of the catalyst according to the present invention having a textile sheet structure.

Embodiments of the present invention relate to a catalyst having a gas-permeable textile sheet structure composed of noble metal-containing wire and having a three-dimensional secondary structure produced thereon.

Catalysts according to the present invention are used, in particular, as heterogeneous catalysts, for example, in the preparation of hydrocyanic acid by the Andrussow process or in the preparation of nitric acid by the Ostwald process.

Catalysts having a textile sheet structure composed of noble metal-containing wire generally have a low dimensional stiffness, are flexible and can easily be deformed mechanically. In order to increase the mechanical stability and dimensional stiffness of the textile sheet structure, the textile sheet structure according to the present invention is provided with a secondary structure in the form of a dent structure (hereinafter also referred to as an "indentation structure").

The dent structure of the textile sheet structure comprises a plurality of three-dimensional dents produced on the sheet structure, which contribute to the mechanical stability of the latter. Due to the dent structure extending in two dimensions and having dents which are arranged in rows next to one another in two dimensions, an increase in the stiffness and the dimensional stability over the sheet is achieved.

In comparison with a textile sheet structure having a secondary structure in the form of folding, the textile sheet structure having such a dent structure exhibits good dimensional stability in three dimensions. Although folding of a sheet-like body in a direction normal to the sheet and the folding/bending axis also leads to mechanical stabilization of the body, a folded sheet structure has a low dimensional stability in the direction perpendicular to the axis of folding. This disadvantage is avoided by a dent structure, since the dent structure contributes to an increase in the dimensional stability in all three dimensions.

In addition, compared to folds, such dent structures do not give a pronounced preferential direction, so that catalytically inefficient flow paths and locally different flow resistances are avoided which, in turn, contribute to a high efficiency and catalytic yield.

In contrast to folded structures and especially to the known embossing patterns, the textile sheet structure according to the present invention is produced by self-organizing dent structuring, and is therefore less mechanically stressed, in particular by textile forces. In contrast to folding and embossing, virtually no flow processes take place in dent structuring and it is, therefore, not associated with any significant increase in surface area, as explained in more detail below.

The dent structure is formed at least partially by self-organization in the course of the denting operation. In contrast to a rolling or embossing process, in which the shaping of a total surface is predetermined by, for example, the exterior shape of a negative mold, the term self-organization refers to an operation in which the surface of the workpiece to be reshaped can, without being completely prescribed by a negative mold, at least partially form automatically during the reshaping process. Secondary structures produced by self-organization have a particularly energetically favorable form and low plastic deformation, and thus low local weakening. As such, a textile sheet structure having particularly good mechanical dimensional stability and stiffness is obtained.

Such a self-organizing dent structure can be applied relatively simply to the textile sheet structure. The dent structure is preferably produced by a pressing mechanism or means using a structured support element, for example, by a liquid pressing mechanism (hydraulic), a gaseous pressing mechanism (pneumatic) and/or by a solid, elastic pressing mechanism. The indentation pressure used for producing the dent structure can consist either of a positive pressure or a negative pressure. Such a procedure for producing a dent structure on plate-like components is described in EP 0 693 008 B1.

The support element predetermines the dent structure in contact with the textile sheet structure moving over it. For example, the support element has a loop or zig-zag shape. However, the support element may also have, for example, a spiral shape, ring shape or disk shape.

The indentations have a circumference, for example, in a projection onto the base area of the textile sheet structure. The basic shape of the indentations is fixed by the circumference of the indentations. The indentations produced by self-organization have, according to the present invention, the shape of a hexagon. Indentations having a hexagonal basic shape contain little internal energy and contribute to a higher mechanical stability and dimensional stiffness of the textile sheet structure. The hexagonal basic shape can be rounded in the region where the sides of the hexagons join.

In addition, a dent-structured, textile sheet structure contributes to optimized flow behavior both of a single sheet structure and of the total catalyst. In the case of a catalyst which has a textile sheet structure composed of a noble metal-containing wire according to the present invention and through which a fluid flows, the textile sheet structure is normally arranged transverse to the flow direction through the catalyst, and has openings, for example in the form of measures or loops, which ensure flow through the catalyst in the flow direction. The smaller the width of these openings, the more likely that the starting materials will impinge on the catalyst surface, so that catalysis of the reaction can take place and the speed and direction of the chemical processes can be influenced. For the purposes of good contact catalysis, the openings are therefore very small. However, a small width of the openings is associated with a high flow resistance and therefore high pressure differences.

Each indentation of the dent structure contains a plurality of such openings. As a result of the dent structure, the planes of openings partially run obliquely to a base area of the textile sheet structure in the region of the indentations, so that an oblique arrangement of the openings relative to the flow direction is also basically obtained. This leads, despite a constant width of the openings, to a reduction in the effective width of the openings in the textile sheet structure and also results in the probability of contact of a starting material with a catalyst surface being increased, and therefore also contributes to more effective catalysis.

In a preferred embodiment of the catalyst of the present invention, the sheet structure is defined by a base area in which the dent structure extends in two dimensions, with the indentations running perpendicular to the base area.

A catalyst gauze which extends over an area and has indentations arranged perpendicularly thereto has a high mechanical strength due to the indentations. Such a catalyst gauze is also simple and inexpensive to manufacture.

In another preferred embodiment of the catalyst of the present invention, the catalyst is configured for flow of a fluid through the catalyst in the flow direction and the base area runs perpendicular to the flow direction.

The arrangement of the base area perpendicular to the flow direction contributes to very uniform flow through the catalyst. In this arrangement, the individual indentations have a middle region in which the openings in the textile sheet structure are arranged parallel and offset to the base area and also a peripheral region. The openings in the peripheral region are arranged transverse to the flow direction; in a projection onto the base area, they have a lower width of the openings and thus aid impingement of a starting material onto the catalyst surface and thus the catalysis.

In an advantageous embodiment of the catalyst of the present invention, adjacent indentations are separated from one another by an edge zone.

The edge zone fixes a base area of the textile sheet structure and the hexagonal basic structure of the indentations. Based on the base area defined by the edge zone, the indentations have a region of maximum indentation (e.g., deflection). Adjacent indentations are separated from one another by the edge zone. The edge zone avoids sharp transitions between adjacent indentations and thus contributes to the mechanical strength of the catalyst gauze. The edge zone can be in the form of an area or approximately linear.

In the case of an edge zone over an area, it is useful the edge zone to have a width in the range from 0.1 mm to 10 mm, preferably in the range from 1 mm to 5 mm.

The textile sheet structure comprises a plurality of indentations with edge zones. An edge zone having a width of at least 0.1 mm contributes to good stabilization of the sheet structure and good dimensional stiffness. An edge zone having a width of more than 10 mm is associated with a high proportion of edge zone area in the total area of the textile sheet structure. As a result, the effect of the openings arranged obliquely in the region of the indentations on the flow behavior of the catalyst is lost.

In a preferred embodiment of the catalyst of the present invention, the area of one of the hexagonal indentations in a projection on a flat base area has a size in the range from 0.25 cm$^2$ to 15 cm$^2$, preferably in the range from 0.5 cm$^2$ to 3 cm$^2$.

Indentations whose area is less than 0.25 cm$^2$ consistently lead to a high proportion of the area of the edge zone in the total area of the textile sheet structure, as a result of which the effect of the openings arranged obliquely in the region of the indentations on the flow behavior of the catalyst is lost. Indentations having a size of greater than 15 cm$^2$ contribute only slightly to mechanical stabilization and an increase in the dimensional stability of the textile sheet body.

It has been found to be advantageous for the depth of the indentations to be in the range from 1 mm to 10 mm, preferably in the range from 2 mm to 5 mm.

Indentations having a depth in such a range are simple and inexpensive to manufacture. Such indentations additionally lead to only a low mechanical stress and plastic deformation during reshaping of the textile sheet structure, so that the latter has good mechanical stability.

The noble metal-containing wire is preferably made of a platinum metal or an alloy thereof.

The noble metal-containing wire consists of noble metal or contains an appreciable proportion (i.e., >50% by weight) of noble metal. The noble metal is preferably a platinum metal. For the present purposes, the term platinum metal refers to the elements osmium, iridium, platinum, ruthenium, rhodium, palladium. Platinum metals are suitable for use in catalysts.

It has been found to be advantageous for the catalyst to comprise a plurality of textile sheet structures arranged one after the other, with the indentations of adjacent sheet structures being offset relative to one another.

A plurality of textile sheet structures arranged one after the other contribute to efficient conversion of the starting materials. In contrast to a catalyst in which a plurality of sheet structures with their indentations are arranged directly one after the other, the offset arrangement of the sheet structures, both of the indentations and of the edge zones, and the associated alternating flow through the sheets ensure very uniform flow through the catalyst. The offset arrangement of sheet structures arranged one after the other therefore contributes to good flow behavior through the catalyst.

Preferably, the textile sheet structures has an upper side having concave, inward-curving indentations and an underside having convex outward-curving indentations. Preferably, the textile sheet structures are arranged one after the other in such a way that the upper side and the underside of the textile sheet structures are located opposite one another.

The upper side and the underside can also differ in their dimensional stability in the flow direction and in the opposite direction. If the upper side and the underside of the textile sheet structures are located opposite one another, the sheet structure has an approximately equal mechanical stability both in the flow direction and in the opposite direction. As a result, the catalyst does not have any preferential direction and may be installed in both directions in a reactor. At the same time, the opposed arrangement gives as compact arrangement of the textile sheet structures, which contributes to high dimensional stability and uniform flow through the catalyst.

In a preferred embodiment of the catalyst of the present invention, the textile sheet structure has openings having a width of the openings of less than 500 μm, preferably in the range from 5 μm to 300 μm.

FIG. 1 shows a plan view of a first embodiment of the catalyst of the present invention, which is denoted overall by the reference numeral 1. The catalyst 1 comprises 25 catalyst gauzes arranged one after the other and offset relative to one another, of which only the uppermost catalyst gauze 2 is shown in FIG. 1. The catalyst gauzes which are not shown in FIG. 1 are configured similar to or the same as the catalyst gauze 2.

The catalyst gauze 2 is a textile sheet structure in the form of a formed-loop knit which has been produced by machine formed-loop knitting of a noble metal-containing wire 3. The noble metal-containing wire 3 is made of a platinum-rhodium alloy (95/5) and has a wire diameter of 76 μm. The catalyst gauze 2 has a weight per unit area of 7.3 g/dm$^2$. The measured openings are denoted by the reference numeral 7.

In another embodiment (not shown), the catalyst gauze is a textile sheet structure in the form of a woven mesh having an average mesh opening of 236 μm.

In addition, the catalyst gauze 2 is provided with a three-dimensional secondary structure. It has a dense-structured surface produced hydraulically using a liquid pressing mechanism and a shape-imparting support element. Suitable support elements are, for example, a spiral, polygons, rings or disks.

The action of pressure gives an indentation structure produced by self-organization, which displays particular mechanical stability. The catalyst gauze 2 has a honeycomb-like indentation structure due to arrangement of hexagonal indentations in rows next to one another. The individual indentations 4 are curved in a direction below the plane of the drawing and are arranged in rows next to one another into directions x, y. Adjacent indentations 4 are separated from one another by an edge zone 5. The edge zone 5 is in the form of an area and has a width of about 2 mm. In a projection onto a gauze plane 6 defined by the edge zone 5, the indentations 4 have a hexagonal basic shape. The area of the indentations in the projection onto the gauze plane 6 is about 3 cm². The depth of the indentations is about 2.5 mm.

The catalyst 1 is suitable for preparing nitric acid by the Ostwald process. In the preparation of nitric acid, an ammonia/oxygen mixture is passed through the catalyst (catalytic combustion of ammonia). Here, the following reaction takes place:

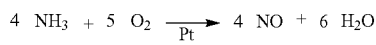

The flow direction runs perpendicular to the gauze plane 6 and is indicated by the arrow z shown in FIG. 1.

Figure 2:
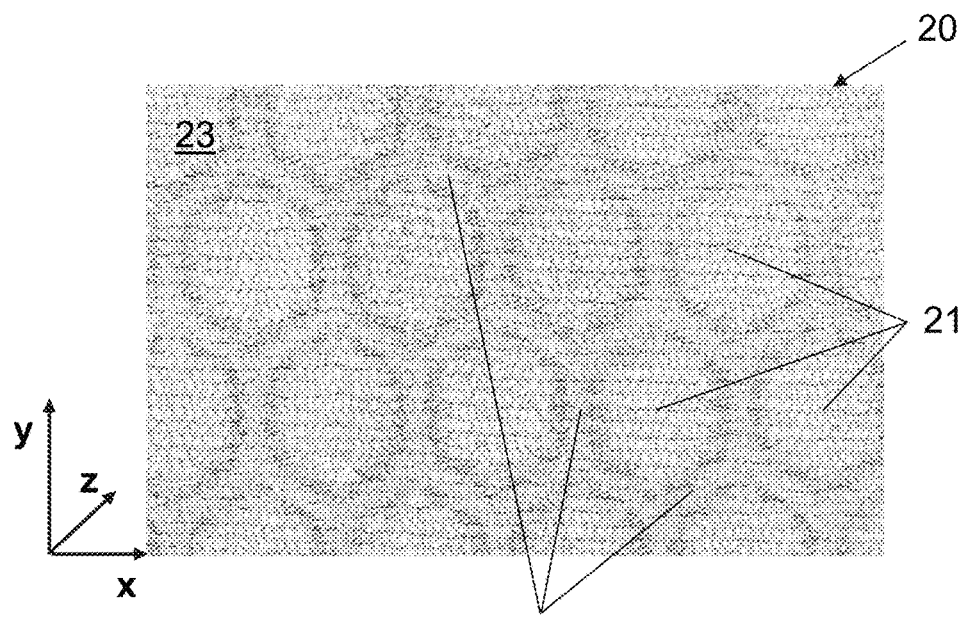
FIG. 2 shows a photograph of a textile sheet structure according to an embodiment of the present invention.

FIG. 2 shows a photo of the catalyst gauze of the present invention, which is overall assigned the reference numeral 20. The catalyst gauze 20 is a formed-loop knit made of a platinum/rhodium (95/5) wire having a wire diameter of 76 μm. The formed-loop knit has an indentation-structured surface which has been produced by action of pressure onto the formed-loop knit with the aid of a sinusoidal support element. The indentation-structured, honeycomb-like surface is formed by self-organization, so that the catalyst gauze 20 has a high mechanical stability.

The indentation structure of the catalyst gauze has indentations 21 arranged in rows next to one another in two dimensions. The individual indentations 21 are curved in the direction below the plane of the drawing and are arranged in rows next to one another in two directions x, y. Adjacent indentations 21 are separated from one another by an edge zone 22. The edge zone 22 has a width of about 2.5 mm. In a projection onto a gauze plane 23 defined by the edge zone 22, the indentations 21 have a rounded polygonal basic shape. The area of one of the indentations 21 in the projection onto the gauze plane 23 is about 2 cm². The depth of the indentations is about 3 mm.

Figure 3:
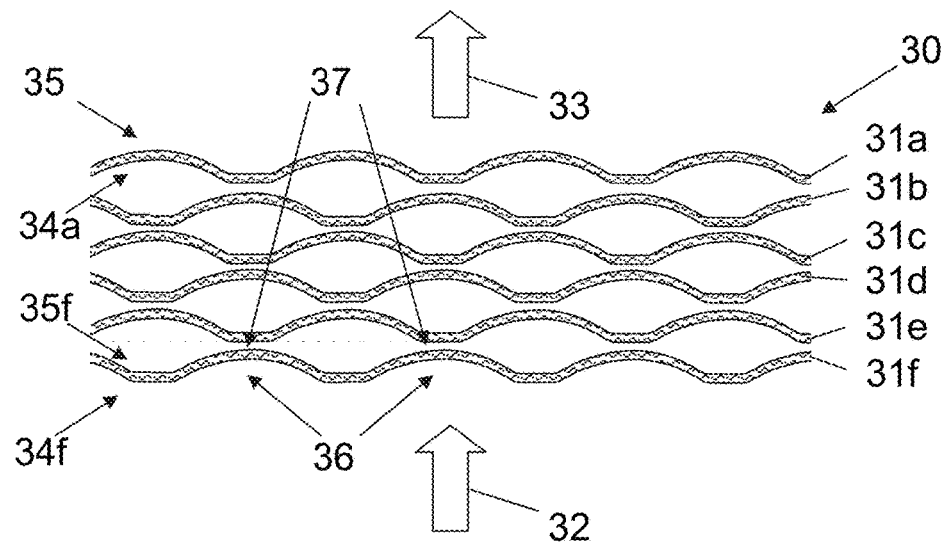
FIG. 3 schematically shows an embodiment of the catalyst according to the present invention having a plurality of textile sheet structures arranged one after the other and offset relative to one another.

FIG. 3 shows an embodiment of a catalyst 30 having six catalyst gauzes 31a-f in cross section. The catalyst 30 is suitable for the preparation of hydrocyanic acid by the Andrussow process. In the preparation of hydrocyanic acid, a gaseous ammonia/methane/air mixture flows through the catalyst 30. The flow direction runs perpendicular to the gauze plane of the catalyst gauzes 31a-f and is indicated by the arrows 32, 33.

The catalyst gauzes 31a-f each have an upper side 34a-f and an underside 35a-f. For the sake of simplicity, only the upper sides 34a, 34f and the undersides 35a, 35f are identified in FIG. 3. The upper sides 34a-f have indentations 36, while the undersides 35a-f show the outward dents 37 corresponding to the indentations 36. The catalyst gauzes 31a-f are arranged one after the other in such a way that the upper side of a first gauze and the underside of the subsequent, second gauze are in each case opposite one another.

Figure 4:
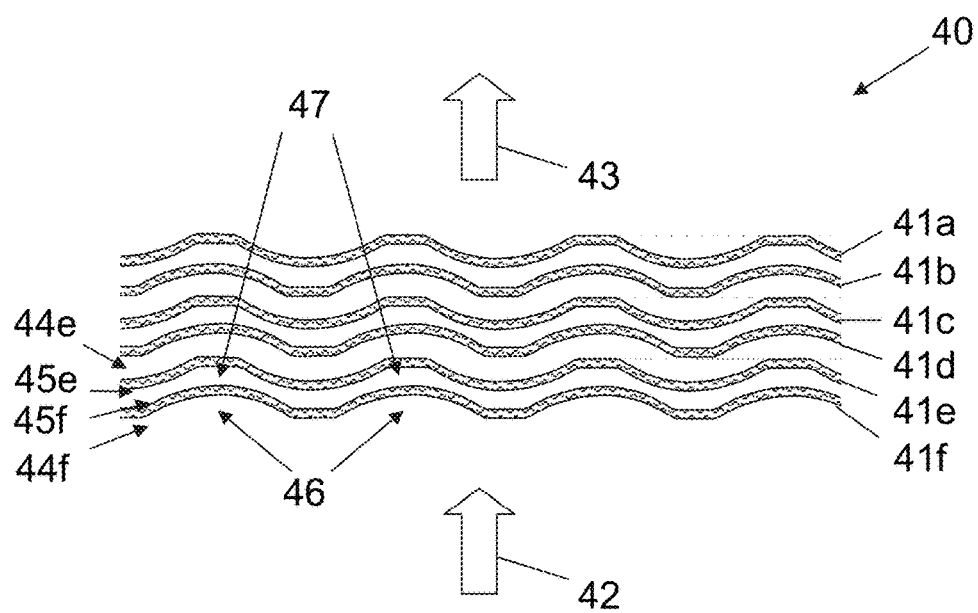
FIG. 4 schematically shows an embodiment of the catalyst according to the present invention having a plurality of textile sheet structures which are arranged one after the other and whose upper side and underside are opposite one another.

FIG. 4 shows, in cross section, a further embodiment of a catalyst 40 having six catalyst gauzes 41a-f. The catalyst 40 is suitable for the preparation of nitric acid by the Ostwald process. In the preparation of nitric acid, a gaseous ammonia/oxygen mixture is passed through the catalyst 40. The flow direction runs perpendicular to the gauze plane of the catalyst gauzes 41a-f and is indicated by the arrows 42, 43.

The catalyst gauzes 41a-f each have an upper side 44a-f and an underside 45a-f. For the sake of simplicity, only the upper sides 44e, 44f and the undersides 45e, 45f are identified in FIG. 4.

The upper sides 44a-f have concave inward-curving indentations 46 having a hexagonal basic structure; the undersides 45a-f show the convex outward dents 47 corresponding to the indentations 46. The catalyst gauzes 41a-f are arranged one after the other in such a way that the upper side of a first gauze and the upper side of the subsequent, second gauze are opposite one another in each case.

To test the catalytic efficiency of the catalyst gauze of the present invention, comparative experiments were carried out and the following catalyst systems were tested in an existing plant. Table 1 provides a summary of the reactors tested.

TABLE 1

| Reactors tested | |
|---|---|
| Reactor 1 (reference structure) | Reactor 2 (indentation structure) |
| 5 × PtRh5 gauzes + 1 × Kanthal gauze | 4 × PtRh5 gauzes having an indentation structure + 1 × Kanthal gauze |
| Weight per unit area/gauze: 600 g/cm³ | Weight per unit area/gauze: 760 g/cm³ |
| Diameter: 110 mmm | Diameter 110 mmm |
| Total weight of gauze packet: 27.7 g | Total weight of gauze packet: 27.9 g |

The PtRh5 catalyst gauzes in the reference structure of Reactor 1 were flat and were arranged above one another. The catalyst packet consists of five gauzes composed of PtRh without indentation structure and one layer of Kanthal gauze.

The catalyst packet in Reactor 2 consists of four layers of catalyst gauze composed of PtRh5 having an indentation structure, finished by one layer of Kanthal gauze. Adjacent catalyst gauzes were arranged over one another in such a way that the indentations were located in one another, as is shown in FIG. 4.

The Kanthal gauze of both gauze packets of Reactors 1 and 2 performs a function which is not essential to the present invention, namely separating the respective catalytic gauzes from the support underneath.

The experimental results compiled include the catalyst efficiency of the catalyst (yield of NO in %), the nitrous oxide formed as an undesirable by-product present in the reaction gas (in ppm by weight), the pressure drop over the catalyst bed (in mm of $H_2O$), and the temperature. The series of experiments were, in each case, carried out for an ammonia throughput of 8 and 12 tN/m² d.

For the measurements, the reactors were operated using the following parameters:

Pressure: 3.5 and 5 bar abs.

Temperature: 860 and 890° C.

Throughput: 8 and 12 t N/(m²day)

$NH_3$ concentration: 6.7±0.05% by weight

To provide an overview, the average values were calculated from the measured individual values for the NO yield and $N_2O$ contents. These average values are listed in Table 2. In addition, the measured pressure drops and temperatures are listed in Table 3.

TABLE 2

NO yield and $N_2O$ contents (averages)

| | | Reactor 1 (reference structure) | | Reactor 2 (Indentation structure) | |
|---|---|---|---|---|---|
| Throughput t N/(m² day) | $NH_3$ conc. % by wt. | NO yield % | $N_2O$ content ppm | NO yield % | $N_2O$ content ppm |
| 12 | 6.70 | 92.6 | 1495 | 93.7 | 1503 |
| 8 | 6.72 | 95.5 | 1488 | 96.4 | 1515 |

TABLE 3

Pressure drops and temperatures (averages)

| | | Reactor 1 (reference structure) | | Reactor 2 (Indentation structure) | |
|---|---|---|---|---|---|
| Throughput t N/(m² day) | Pressure bar abs. | Pressure drop mm $H_2O$ | Temperature °C. | Pressure drop mm $H_2O$ | Temperature °C. |
| 12 | 5 | 4.1 | 896 | 4.8 | 888 |
| 8 | 3.5 | 3.5 | 863 | 3.5 | 853 |

The experimental results indicate that the catalyst deficiency for the packet of catalyst gauzes having an indentation structure (i.e., Reactor 2) is about 0.9% higher or 1.1% higher than in the case of the packet of catalyst gauzes without indentation structure (i.e., Reactor 1). In the field of the present invention, this represents a significant and economically important increase which is attributed to the fact that, in the case of an indentation structure, the probability of contact of a starting material with the catalyst surface is comparatively greater and therefore contributes to more effective catalysis.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A catalyst comprising:
 a gas-permeable textile sheet structure composed of noble metal-containing wire and having a three-dimensional secondary structure produced thereon, the secondary structure being a dent structure having adjacent dents arranged next to one another in two dimensions, the dent structure having the shape of a hexagon and being formed by self-organization in a denting operation.

2. The catalyst according to claim 1, wherein the sheet structure defines a base area in which the dent structure extends in two dimensions and wherein the catalyst is configured for the flow of a fluid through the catalyst in a flow direction, the base area extending perpendicular to the flow direction.

3. The catalyst according to claim 1, wherein adjacent indentations are separated from one another by an edge zone.

4. The catalyst according to claim 1, wherein the noble metal-containing wire is made of a noble metal.

5. The catalyst according to claim 1, wherein the catalyst comprises a plurality of textile sheet structures arranged one after the other, indentations of adjacent textile sheet structures being offset relative to one another.

6. The catalyst according to claim 5, wherein each of the textile sheet structures has an upper side having concave, inward-curving indentations and an underside having convex outward-curving indentations, and wherein the textile sheet structures are arranged one after the other such that the upper sides and the undersides of the textile sheet structures are located opposite one another.

7. The catalyst according to claim 1, wherein the textile sheet structure has openings, each opening having a width of less than 500 µm.

\* \* \* \* \*